(12) United States Patent
Kasai

(10) Patent No.: US 12,729,072 B2
(45) Date of Patent: Sep. 8, 2026

(54) CAPSULE DIRECTION RESTRICTING MECHANISM

(71) Applicant: QUALICAPS CO., LTD., Yamatokoriyama (JP)

(72) Inventor: Kenichi Kasai, Yamatokoriyama (JP)

(73) Assignee: QUALICAPS CO., LTD., Yamatokoriyama (JP)

( * ) Notice: Subject to any disclaimer, the term of this patent is extended or adjusted under 35 U.S.C. 154(b) by 101 days.

(21) Appl. No.: 18/255,426

(22) PCT Filed: Nov. 19, 2021

(86) PCT No.: PCT/JP2021/042585

§ 371 (c)(1),
(2) Date: Jun. 1, 2023

(87) PCT Pub. No.: WO2022/124051

PCT Pub. Date: Jun. 16, 2022

(65) Prior Publication Data

US 2024/0002167 A1 Jan. 4, 2024

(30) Foreign Application Priority Data

Dec. 9, 2020 (JP) ................................ 2020-203867

(51) Int. Cl.
*B65G 47/256* (2006.01)
*B65G 47/244* (2006.01)

(52) U.S. Cl.
CPC ......... *B65G 47/256* (2013.01); *B65G 47/244* (2013.01); *B65G 2201/027* (2013.01)

(58) Field of Classification Search
CPC ................ B65G 47/256; B65G 47/244; B65G 2201/027; B65G 11/081;
(Continued)

(56) References Cited

U.S. PATENT DOCUMENTS 4,343,130 A * 8/1982 Facchini ................. A61J 3/074 53/272
4,393,973 A * 7/1983 Ackley, Sr. ........ B65G 47/1471 198/398

(Continued)

FOREIGN PATENT DOCUMENTS

CN 100554089 C * 10/2009
DE 3726161 A1 * 2/1989 ........... B65G 47/256

(Continued)

*Primary Examiner* — Gene O Crawford
*Assistant Examiner* — Muhammad Awais
(74) *Attorney, Agent, or Firm* — Muncy, Geissler, Olds & Lowe, P.C.

(57) ABSTRACT

A capsule direction restricting mechanism includes a supply path 10, a restricting device 20, and a discharge path 30. The restricting device 20 includes: a pressing member 40 that presses a capsule 90 at a predetermined position P in a width direction, and moves the capsule 90 toward the discharge path 30; and a slit-like posture changing portion 50 that is disposed between the predetermined position P and the discharge path 30, and changes the posture of the capsule 90. The posture changing portion 50 causes the cap 92 to slide and generate a frictional force when the capsule 90 passes through the posture changing portion 50, and thus causes the body 91 to precede the cap 92. The pressing member 40 includes: a protruding portion 41 that presses an axially central portion of the capsule 90; and cap pressing portions 42 and 43 that are provided on both sides of the protruding portion 41, and presses the cap 92 of the capsule 90 whose posture has been changed by the posture changing portion 50.

9 Claims, 5 Drawing Sheets

(58) Field of Classification Search

CPC ............ B65G 2201/0214; B65G 43/08; B65G 47/14; B65G 47/18; B65G 47/71; B65B 35/58

USPC .................................. 198/399; 221/222, 277

See application file for complete search history.

(56) References Cited

U.S. PATENT DOCUMENTS

| | | | | | |
|---|---|---|---|---|---|
| 4,394,933 | A * | 7/1983 | Ackley | B65G 47/1471 198/377.01 |
| 4,413,556 | A * | 11/1983 | Ackley | B41F 17/36 101/40 |
| 4,744,492 | A * | 5/1988 | Hackmann | B65D 83/0409 221/204 |
| 6,162,998 | A * | 12/2000 | Wurst | G01G 17/00 221/277 |
| 6,877,611 | B2 * | 4/2005 | Yamamoto | B07C 5/18 209/595 |
| 2006/0016827 | A1 * | 1/2006 | Hatsuno | G07F 11/24 221/277 |

FOREIGN PATENT DOCUMENTS

| | | | | | |
|---|---|---|---|---|---|
| DE | 202011003680 | U1 | * | 6/2011 | A61J 3/074 |
| JP | 1974-121978 | U | | 10/1974 | |
| JP | 49121978 | U | * | 10/1974 | |
| JP | 55-106158 | A | | 8/1980 | |
| JP | S57-93824 | A | | 6/1982 | |
| JP | 7-181001 | A | | 7/1995 | |
| JP | 2017176646 | A | * | 10/2017 | |
| WO | WO-2012152412 | A1 | * | 11/2012 | A61J 3/074 |

* cited by examiner

CAPSULE DIRECTION RESTRICTING MECHANISM

TECHNICAL FIELD

The present invention relates to a capsule direction restricting mechanism.

BACKGROUND ART

Conventionally, when capsules each including a cap and a body are continuously supplied to fill the capsules with contents, measure mass and dimensions, and the like, the direction of each capsule is restricted beforehand so that the caps of the respective capsules face the same direction.

For example, in a dimension measuring device disclosed in Patent Literature 1, capsules supplied in a line from a hopper through a supply chute are sequentially conveyed toward a direction restricting drum by a supply drum. The direction restricting drum is designed to restrict the direction of a capsule received in a pocket, and, in a case where a capsule is received with either the cap side or the body side first, the direction restricting drum transfers the capsule with the cap side first to the drum in the subsequent stage so that the dimensions of the cap and the body can be measured.

CITATION LIST

Patent Literature

Patent Literature 1: JP 7-181001 A

SUMMARY OF INVENTION

Technical Problem

In the capsule direction restriction with the direction restricting drum, the diameter of the direction restricting drum needs to be increased to some extent, and therefore, the mechanism tends to be large. One of the known conventional capsule direction restricting mechanisms is a mechanism of a "raceway type" in which two rods reciprocate in a vertical direction and a horizontal direction, respectively. However, this mechanism is a complicated mechanism involving two strokes, and therefore, there is a demand for simplification of the process and the structure.

In view of the above, the present invention aims to provide a capsule direction restricting mechanism capable of reliably restricting the direction of a capsule with a compact configuration.

Solution to Problem

The objective of the present invention can be achieved with a capsule direction restricting mechanism that includes: a supply path through which a capsule having a cap externally fitted to a body is supplied to a predetermined position; a restricting device that restricts the direction of the capsule supplied to the predetermined position; and a discharge path through which the capsule whose direction is restricted by the restricting device is discharged to the outside. The restricting device includes: a pressing member that presses the capsule at the predetermined position in a width direction, and moves the capsule toward the discharge path; and a slit-like posture changing portion that is disposed between the predetermined position and the discharge path, and changes the posture of the capsule. The posture changing portion causes the cap to slide and generate a frictional force when the capsule passes through the posture changing portion, and thus causes the body to precede the cap. The pressing member includes: a protruding portion that presses an axially central portion of the capsule; and a cap pressing portion that is provided on each side of the protruding portion, and presses the cap of the capsule whose posture has been changed by the posture changing portion.

In this capsule direction restricting mechanism, the pressing member preferably presses the capsule obliquely downward with respect to a horizontal direction. More preferably, the angle between the horizontal direction and the pressing direction of the pressing member is 30 to 60 degrees.

The supply path is preferably formed so as to move the capsule introduced through an upper opening in an axial direction, and the discharge path is preferably formed so as to move the capsule in the axial direction and discharge the capsule through a lower opening. More preferably, the upper opening and the lower opening are located on the same vertical line.

The cap pressing portion preferably includes an air injecting portion that injects air toward the cap when the cap is pressed.

The supply path is preferably formed to be capable of aligning and supplying a plurality of capsules to the predetermined position, and the restricting device preferably presses the plurality of the aligned capsules simultaneously with the pressing member and changes the posture of each of the capsules with the posture changing portion, to restrict the direction of each capsule.

A pair of the supply paths, a pair of the restricting devices, and a pair of the discharge paths are preferably provided in a symmetrical manner.

Advantageous Effects of Invention

With a capsule direction restricting mechanism according to the present invention, the direction of a capsule can be reliably restricted with a compact configuration.

BRIEF DESCRIPTION OF DRAWINGS

FIG. 1 is a longitudinal cross-sectional view of a capsule direction restricting mechanism according to an embodiment of the present invention.

FIG. 2 is an enlarged view of a relevant portion viewed from a direction indicated by an arrow A in FIG. 1.

DESCRIPTION OF EMBODIMENTS

Figures 1, 2:
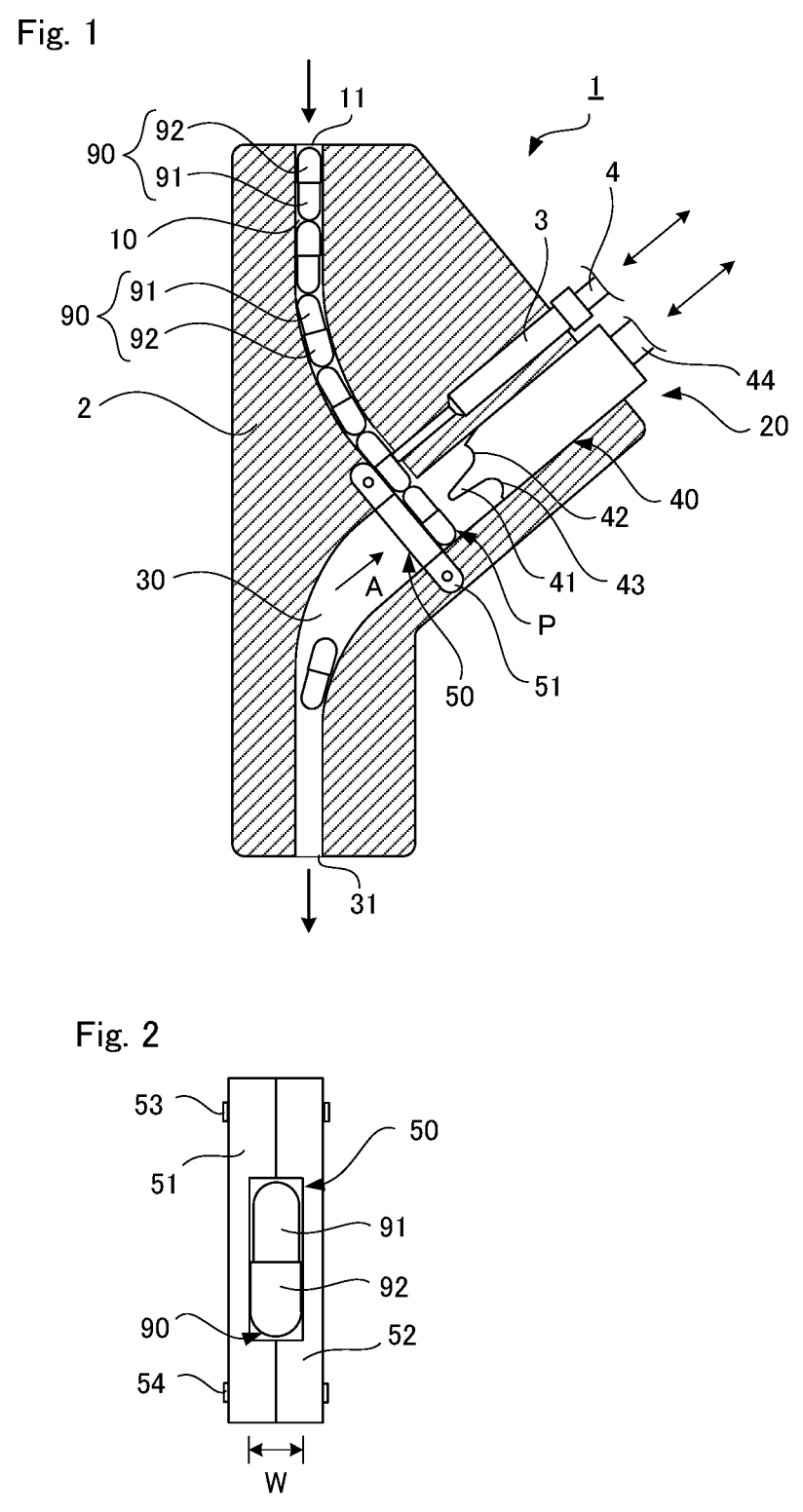
Figure 3:
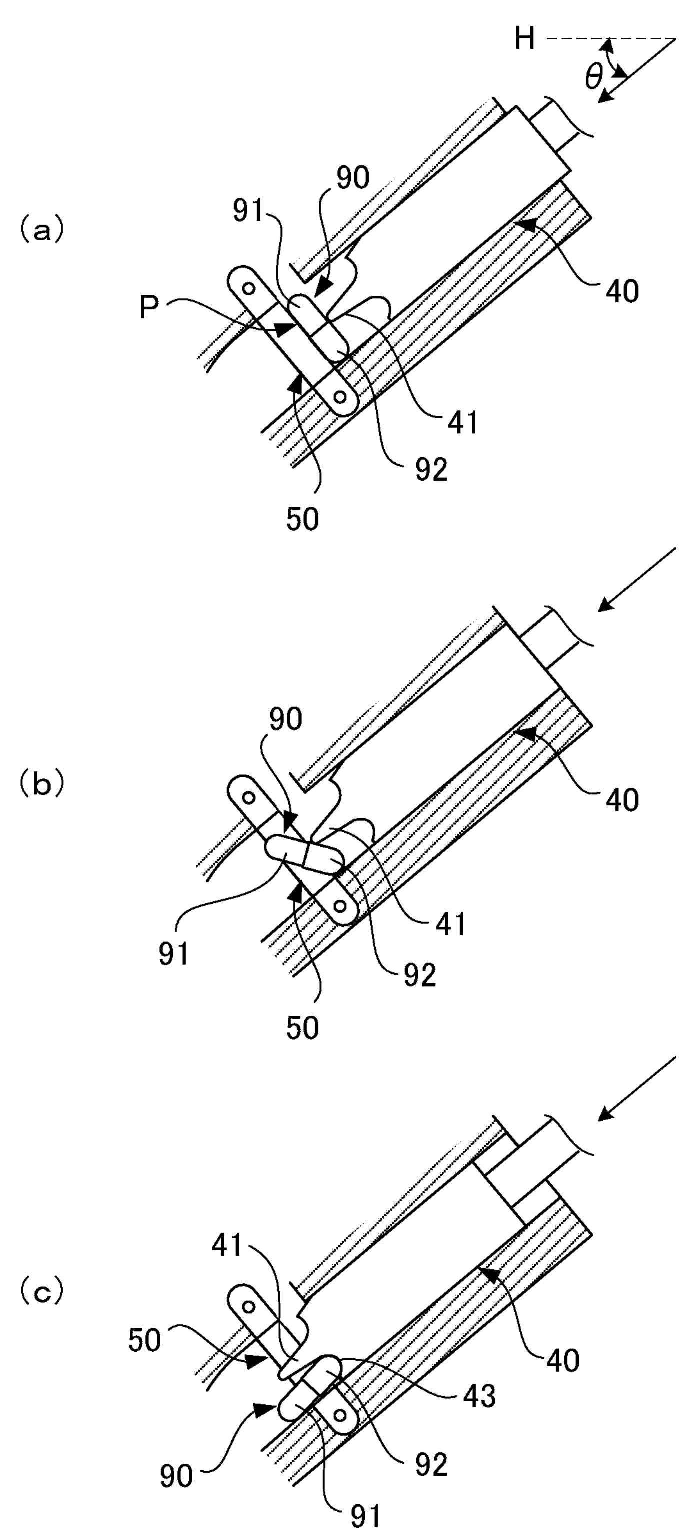
FIG. 3 is cross-sectional views of a relevant portion, showing an example of a process of operation of the capsule direction restricting mechanism shown in FIG. 1.

The following is a description of embodiments of the present invention, with reference to the accompanying drawings. FIG. 1 is a schematic longitudinal cross-sectional view of a capsule direction restricting mechanism (hereinafter referred to as the "direction restricting mechanism") according to an embodiment of the present invention. As illustrated in FIG. 1, a direction restricting mechanism 1 includes a supply path 10, a restricting device 20, and a discharge path 30.

The supply path 10 is formed in a block-like main body 2, and capsules 90 are introduced vertically downward from an upper opening 11 formed in an upper portion of the main body 2. Each capsule 90 is a hard capsule for medicine, for example, and a cap 92 is externally fitted to the body 91 in an axial direction. The supply path 10 has a supply vertical passage extending vertically downward from the upper opening 11 and a central portion (or supply central portion) formed in a curved shape in the side view illustrated in FIG. 1, and has a cross-section in which the capsules 90 can pass only in the axial direction. The capsules 90 introduced in a vertical direction into the supply path 10 through the upper opening 11 are conveyed while being aligned in the axial direction, and are kept in a tilted posture while being supplied to a predetermined position P. A stopper 3 that locks the capsules 90 in the supply path 10 through driving of a rod 4 is provided in the vicinity of the predetermined position P, and the reciprocation of the stopper 3 is controlled, so that the capsules 90 to the predetermined position P can be sequentially supplied at predetermined timings.

The restricting device 20 is a device that restricts the direction of each capsule supplied to the predetermined position P, and includes a pressing member 40 and a posture changing portion 50. The pressing member 40 has an elongated cross-section extending in the axial direction of the capsule 90 supplied to the predetermined position P, and reciprocates as the rod 44 is driven by a driving means (not shown), to press the capsule 90 at the predetermined position P in the width direction orthogonal to the axial direction and move the capsule 90 toward the discharge path 30. The posture changing portion 50 is disposed between the predetermined position P and the discharge path 30, and changes the posture of the capsule 90 when the capsule 90 pushed out toward the discharge path 30 by the pressing member 40 is passing therethrough.

The top end side of the pressing member 40 has a shape cut out in a curved shape when viewed in a side view, a protruding portion 41 is formed at a central portion on the tip side, and cap pressing portions 42 and 43 are formed on both the upper and lower sides of the protruding portion 41. The protruding portion 41 presses an axially central portion of the capsule 90. The cap pressing portions 42 and 43 are portions that press the cap 92 of the capsule 90, and are formed in a curved shape in accordance with the surface shape of the cap 92.

FIG. 2 is an enlarged view of a relevant portion viewed from a direction indicated by an arrow A in FIG. 1. As shown in FIG. 2, the posture changing portion 50 is formed in a slit-like shape by joining a pair of elongated pieces 51 and 52 each having a groove-shaped cutout portion at the center with rivets 53 and 54 or the like so that the respective cutout portions face each other. The width W of the posture changing portion 50 is designed to be substantially the same as the width of the cap 92 of the capsule 90, and the cap 92 slides on the inner wall surface of the posture changing portion 50 when the capsule 90 passes through the posture changing portion 50. In a case where the capsule 90 has flexibility, the width W of the posture changing portion 50 may be slightly smaller than the width of the cap 92, or the cap 92 may be designed to pass through the posture changing portion 50 while being elastically deformed.

The discharge path 30 is formed inside the main body 2, includes a central portion located next to the restricting device, a discharge vertical passage located below the collection portion and extending vertically downward, and a lower opening 31, and discharges the capsule 90 whose direction is restricted by the restricting device 20 to the outside through the lower opening 31 formed in a lower portion of the main body 2. The discharge path 30 has a the curved central portion (or discharge central portion) when viewed in a side view, and has a cross-section through which the capsule 90 can pass only in the axial direction. The capsule 90 that has passed through the posture changing portion 50 is conveyed in the axial direction and is discharged vertically downward through the discharge vertical passage and the lower opening 31. The lower opening 31 is located on the same vertical line as the upper opening 11 of the supply path 10.

In the direction restricting mechanism 1 having the above configuration, the capsules 90 stored in a hopper (not shown) or the like is conveyed in the axial direction into the supply path 10 through the upper opening 11. As shown in FIG. 1, the directions of the capsules 90 passing in the supply path 10 are varied, and the capsules each having its cap 92 located on the lower side coexist with the capsules 90 each having its cap 92 located on the upper side. Note that the capsules 90 may be empty capsules, or may be filled with contents.

As shown in FIG. 3(*a*), when a capsule 90 having its cap 92 located on the lower side is supplied to the predetermined position P, the capsule 90 is supported in a tilted state along the inlet of the posture changing portion 50. When the pressing member 40 is driven in the direction indicated by an arrow, and the protruding portion 41 presses the axially central portion of the capsule 90 in the width direction, the capsule 90 is pushed into the posture changing portion 50.

When the capsule 90 is pushed into the posture changing portion 50, the cap 92 slides, to generate a large frictional force between the posture changing portion 50 and the cap 92. Meanwhile, the body 91 to which the cap 92 is externally fitted has a smaller width than the cap 92. Therefore, the frictional force generated between the body 91 and the posture changing portion 50 is smaller than the frictional force generated between the cap 92 and the posture changing portion 50. Accordingly, when the pressing member 40 is further driven in the direction indicated by an arrow, the posture of the capsule 90 changes so that the body 91 precedes the cap 92 as shown in FIG. 3(*b*).

When the pressing member 40 is further driven in the direction indicated by an arrow, the posture of the capsule 90 further changes, and the lower cap pressing portion 43 is brought into contact with the cap 92, as shown in FIG. 3(*c*). As a result, the cap 92 moves together with the pressing member 40 against the frictional force generated between the cap 92 and the posture changing portion 50, and passes through the posture changing portion 50. The capsule 90 that has passed through the posture changing portion 50 is conveyed in the discharge path 30 shown in FIG. 1 by its own weight while maintaining the state in which the body 91 precedes the cap 92, and is discharged through the lower opening 31. The capsule 90 discharged through the lower opening 31 is accommodated in a pocket of a conveying drum (not shown), and is conveyed toward a post-processing device.

Figure 4:
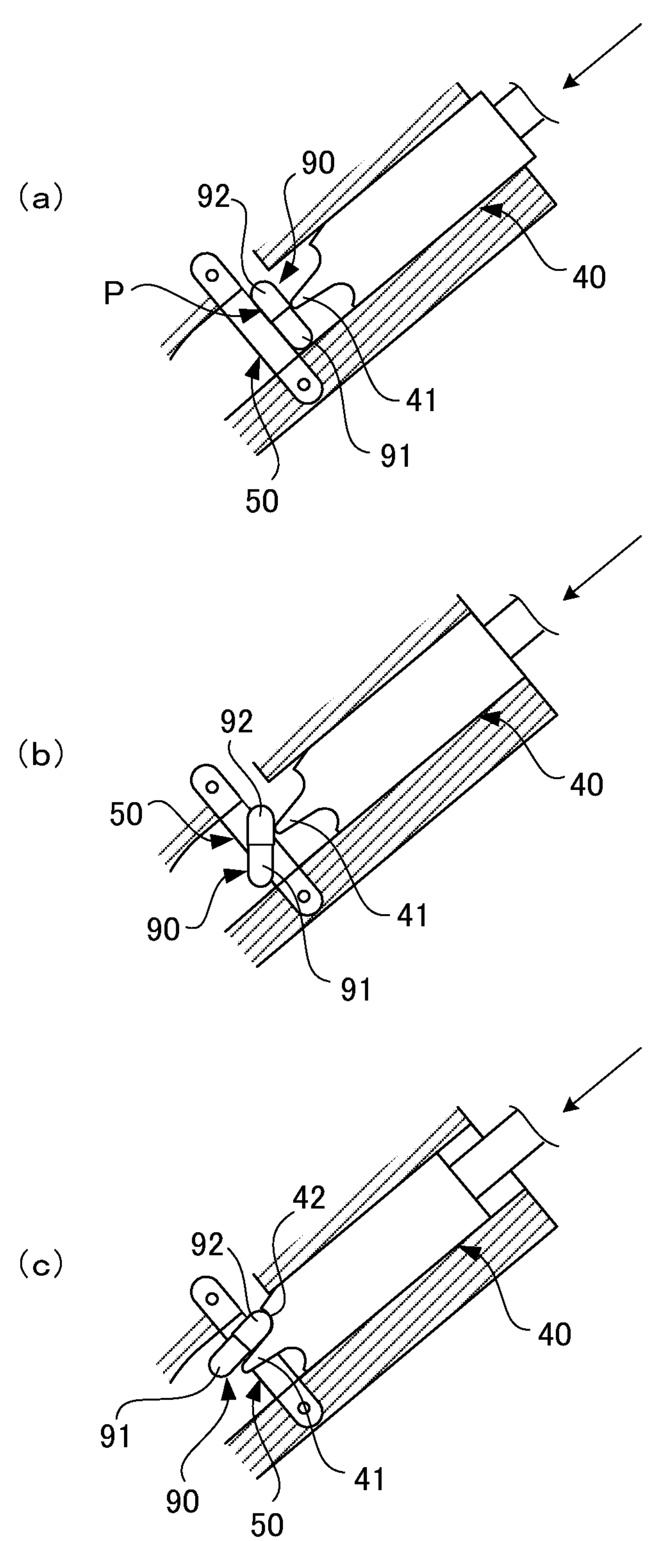
FIG. 4 is cross-sectional views of a relevant portion, showing another example of a process of operation of the capsule direction restricting mechanism shown in FIG. 1.

On the other hand, when a capsule 90 having its cap 92 located on the upper side is supplied to the predetermined position P as shown in FIG. 4(*a*), and the capsule 90 is pushed into the posture changing portion 50 by the pressing of the protruding portion 41, a large frictional force is generated between the cap 92 and the posture changing portion 50 in a manner similar to the above, and the posture of the capsule 90 changes so that the body 91 precedes the cap 92 as shown in FIG. 4(*b*).

When the pressing member 40 is further driven, the posture of the capsule 90 further changes, the upper cap pressing portion 42 is brought into contact with the cap 92, and the cap 92 is forcibly pushed into the posture changing portion 50, as shown in FIG. 4(*c*). As a result, the cap 92 passes through the posture changing portion 50, despite the frictional force generated between the cap 92 and the posture changing portion 50. The capsule 90 that has passed through the posture changing portion 50 is conveyed in the discharge path 30 shown in FIG. 1 while maintaining the state in which the body 91 precedes the cap 92, and is discharged through the lower opening 31.

After the capsule 90 passes through the posture changing portion 50, the pressing member 40 is retracted to the original position. The stopper 3 is then retracted, and the capsule locked by the stopper 3 is supplied to the predetermined position P, so that the directions of the capsules 90 can be sequentially restricted.

With the direction restricting mechanism 1 of this embodiment, even if the directions of the capsules 90 to be supplied into the supply path 10 are varied, it is possible to restrict the direction of each capsule 90 so that the body 91 precedes the cap 92 simply through a pressing operation performed in one direction by the pressing member 40 included in the restricting device 20, and reliably restrict the directions of the capsules 90 with a compact configuration.

The pressing direction of the pressing member 40 that presses each capsule 90 at the predetermined position P in the width direction is not necessarily limited, but is preferably an obliquely downward direction with respect to the horizontal direction so as to reliably change the posture of the capsule 90 passing through the posture changing portion 50 and reliably maintain the changed posture of the capsule 90. More preferably, the angle between the horizontal direction and the pressing direction of the pressing member 40 (an angle θ shown in FIG. 3(*a*)) is preferably 30 to 60 degrees.

The positions and the shapes of the supply path 10 and the discharge path 30 are not limited to any particular positions and shapes either, but it is preferable to form the supply path and the discharge path so that the capsules 90 are smoothly conveyed by their own weights while maintaining their postures as in this embodiment. That is, the supply path 10 is preferably formed so as to move each capsule 90 introduced through the upper opening 11 in the axial direction, and the discharge path 30 is preferably formed so as to move each capsule 90 in the axial direction and discharge the capsule 90 through the lower opening 31. In this configuration, the upper opening 11 and the lower opening 31 are preferably formed on the same vertical line, and with such arrangement, it is possible to facilitate the entire layout design including the devices to be used in the processes before and after the direction restricting mechanism 1, and make the entire configuration compact.

However, each capsule 90 may be supplied to the predetermined position P while being in such a posture that the axial direction is orthogonal to the pressing direction of the pressing member 40. For example, the supply path 10 may be designed to supply each capsule 90 in the width direction. It is also possible to design the discharge path 30 to discharge each capsule 90 in the width direction by changing the direction of conveyance of the capsule 90 that has passed through the posture changing portion 50, instead of designing each capsule 90 to be discharged in the axial direction.

Figure 5:
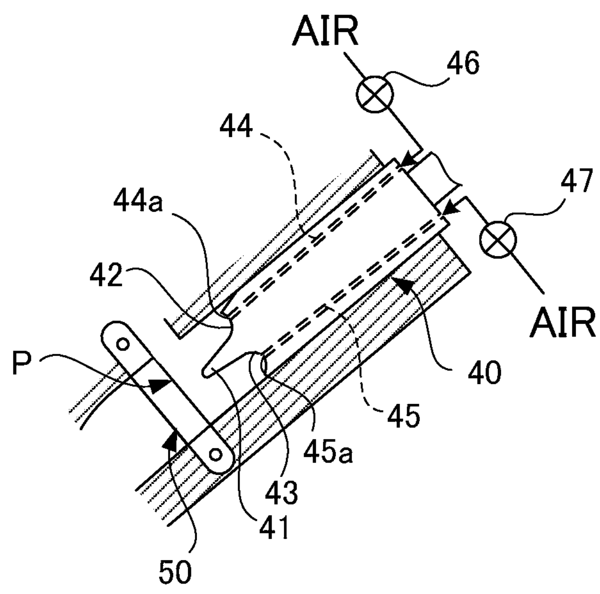
FIG. 5 is a cross-sectional view of a relevant portion of a capsule direction restricting mechanism according to another embodiment of the present invention.

As shown in FIG. 5, air injecting portions 44*a* and 45*a* can be provided in the cap pressing portions 42 and 43 of the pressing member 40, respectively. The air injecting portions 44*a* and 45*a* are connected to a supply source (not shown) of compressed air via air flow paths 44 and 45, and can perform air injection toward the cap 92 by controlling operations of electromagnetic valves 46 and 47 when the cap pressing portions 42 and 43 press the cap 92. With this configuration, each capsule 90 reliably passes through the posture changing portion 50 while the strokes of reciprocation of the pressing member 40 are shortened. Thus, the direction of each capsule 90 can be quickly and reliably restricted.

Figure 6:
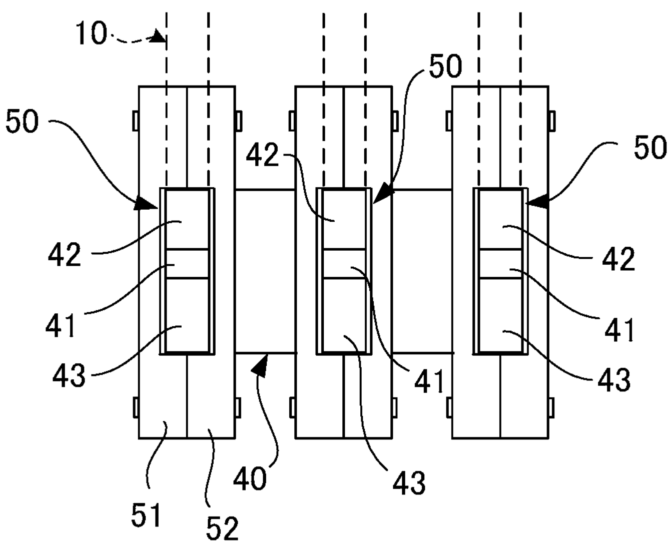
FIG. 6 is an enlarged view of a relevant portion of a capsule direction restricting mechanism according to yet another embodiment of the present invention.

The restricting device 20 of this embodiment is designed to restrict the direction of a capsule 90 by the pressing member 40 pressing the single capsule 90 passing through the posture changing portion 50. However, as shown in an enlarged view of a relevant portion in FIG. 6, the pressing member 40 may include a plurality of protruding portions 41 arranged in parallel, and a plurality of posture changing portions may change the postures of the capsules pressed by the respective protruding portions 41. In this configuration, a plurality of capsules aligned and supplied at a predetermined position through the supply path 10 including a plurality of rows indicated by dashed lines is simultaneously pressed by the pressing member 41, and is pushed into the respective posture changing portions 50. Capsule pressing portions 42 and 43 are formed above and below each pressing member 41, and the capsules after the posture change are pressed by the pressing portions 42 and 43, and then pass through the respective posture changing portions 50 in a manner similar to that in this embodiment. Thus, the directions of a large number of capsules can be efficiently restricted with a compact configuration.

Figure 7:
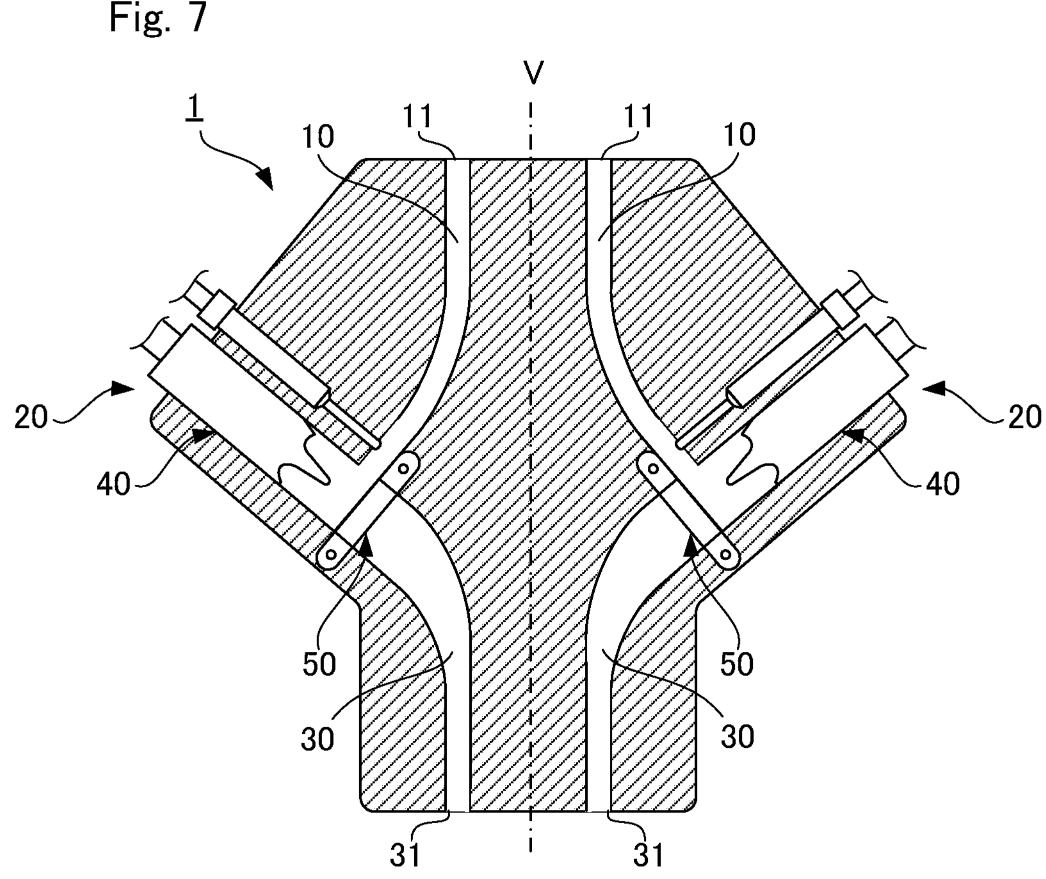
FIG. 7 is a longitudinal cross-sectional view of capsule direction restricting mechanisms according to still another embodiment of the present invention.

As shown in FIG. 7, a plurality of direction restricting mechanisms 1 shown in FIG. 1 may be arranged symmetrically with respect to a vertical plane V, so that a pair of supply paths 10, a pair of restricting devices 20, and a pair of discharge paths 30 can be arranged symmetrically. Like the configuration shown in FIG. 6, the direction restricting mechanisms 1 shown in FIG. 7 can efficiently restrict the directions of a large number of capsules with a compact configuration. The direction restricting mechanisms 1 shown in FIG. 7 may be combined with the configuration shown in FIG. 6 so that each of the right and left restricting devices 20 and 20 can simultaneously restrict the directions of a plurality of capsules.

REFERENCE SIGNS LIST

1 direction restricting mechanism
10 supply path
11 upper opening
20 restricting device
30 discharge path
31 lower opening
40 pressing member
41 protruding portion
42, 43 cap pressing portion
44*a*, 45*a* air injecting portion
50 posture changing portion
90 capsule
91 body
92 cap
P predetermined position

The invention claimed is:

1. A capsule direction restricting mechanism comprising:

a supply path through which a capsule is supplied to a predetermined position wherein the capsule comprises a cap and a body, the cap having a width greater than a width of the body and being externally fitted to the body;

a restricting device that restricts a direction of the capsule supplied to the predetermined position; and a discharge path through which the capsule whose direction is restricted by the restricting device is discharged to outside, wherein the restricting device includes:

a pressing member that presses the capsule at the predetermined position in a width direction of the capsule, and moves the capsule toward the discharge path; and a slit-like posture changing portion that is disposed between the predetermined position and the discharge path, and changes a posture of the capsule, the posture changing portion causes the cap to slide and generate a frictional force when the capsule passes through the posture changing portion, and thus causes the body to precede the cap, the pressing member includes:

a protruding portion that presses an axially central portion of the capsule; and cap pressing portions that are provided on both sides of the protruding portion, and each of the cap pressing portions is configured to press the cap of the capsule whose posture has been changed by the posture changing portion, the supply path includes an upper opening, a supply vertical passage extending vertically downward from the upper opening, and a supply central portion connected to the vertical passage and curved in a side view, wherein the capsule introduced through the upper opening advances vertically downward through the vertical passage and moves to the supply central portion, from which the capsule is discharged to the posture changing portion of the restricting device in a tilted posture that is inclined with respect to a horizontal direction, the posture changing portion includes a slit defined by opposing side walls wherein the slit is inclined at a predetermined angle with respect to the horizontal direction, and a width of the slit is substantially equal to the width of the cap of the capsule, such that the capsule delivered to the posture changing portion is held in the tilted posture along the side walls of the slit, the pressing member is configured to reciprocate while being inclined downward at an angle of 30-60 degrees with respect to the horizontal direction, wherein the slit of the posture changing portion is arranged in a direction perpendicular to a reciprocating direction of the pressing member such that the capsule positioned on the slit is pressed at the axially central portion of the capsule by the protruding portion of the pressing member in a perpendicular direction, the discharge path includes a discharge central portion, a discharge vertical passage located below the discharge central portion and extending vertically downward, and a lower opening, wherein the capsule whose direction is regulated by the restricting portion such that the main body precedes the cap passes through the discharge central portion and moves into the discharge vertical passage, and is discharged vertically downward through the lower opening to the outside.

2. The capsule direction restricting mechanism according to claim 1, wherein the upper opening, the supply vertical passage, the discharge supply passage, and the lower opening are vertically aligned.

3. The capsule direction restricting mechanism according to claim 1, wherein the cap pressing portion includes an air injecting portion that injects air toward the cap when the cap is pressed.

4. The capsule direction restricting mechanism according to claim 1, wherein the supply path is formed to be capable of aligning and supplying a plurality of capsules to the predetermined position, and the restricting device simultaneously presses the plurality of the aligned capsules with the pressing member, and changes a posture of each of the capsules with the posture changing portion, to restrict a direction of each capsule.

5. The capsule direction restricting mechanism according to claim 1, wherein a pair of the supply paths, a pair of the restricting devices, and a pair of the discharge paths are provided in a symmetrical manner.

6. The capsule direction restricting mechanism according to claim 1, wherein a path extending from the upper opening of the supply path to the lower opening of the discharge path does not include a portion along which the capsule moves in the horizontal direction.

7. The capsule direction restricting mechanism according to claim 2, wherein a path extending from the upper opening of the supply path to the lower opening of the discharge path does not include a portion along which the capsule moves in the horizontal direction.

8. The capsule direction restricting mechanism according to claim 1, wherein the posture changing portion includes a pair of elongated pieces, each having a cutout portion at a center thereof such that the opposing side walls of the slit are defined by the cutout portions of the elongated pieces facing each other.

9. The capsule direction restricting mechanism according to claim 2, wherein the posture changing portion includes a pair of elongated pieces, each having a cutout portion at a center thereof such that the opposing side walls of the slit are defined by the cutout portions of the elongated pieces facing each other.

* * * * *